June 24, 1941.  A. G. HERRESHOFF  2,246,847
SUSPENSION MECHANISM
Filed Nov. 10, 1939  2 Sheets-Sheet 1
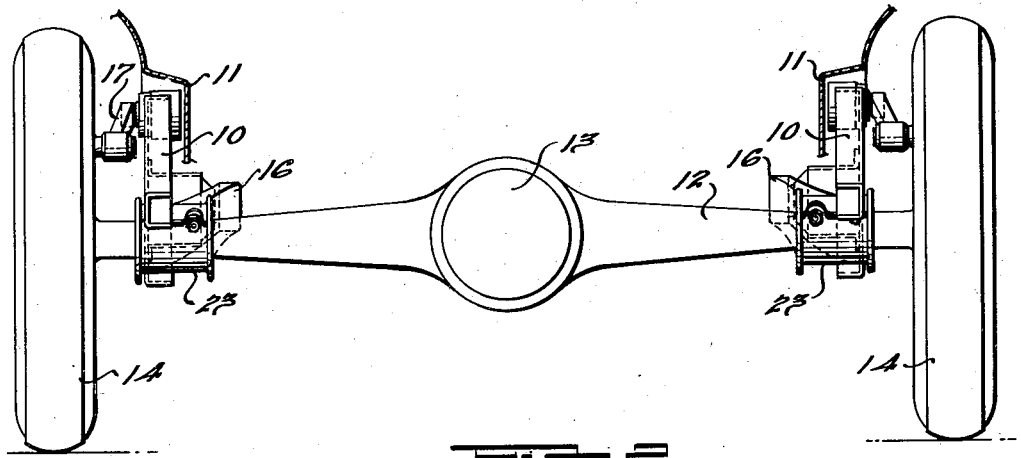
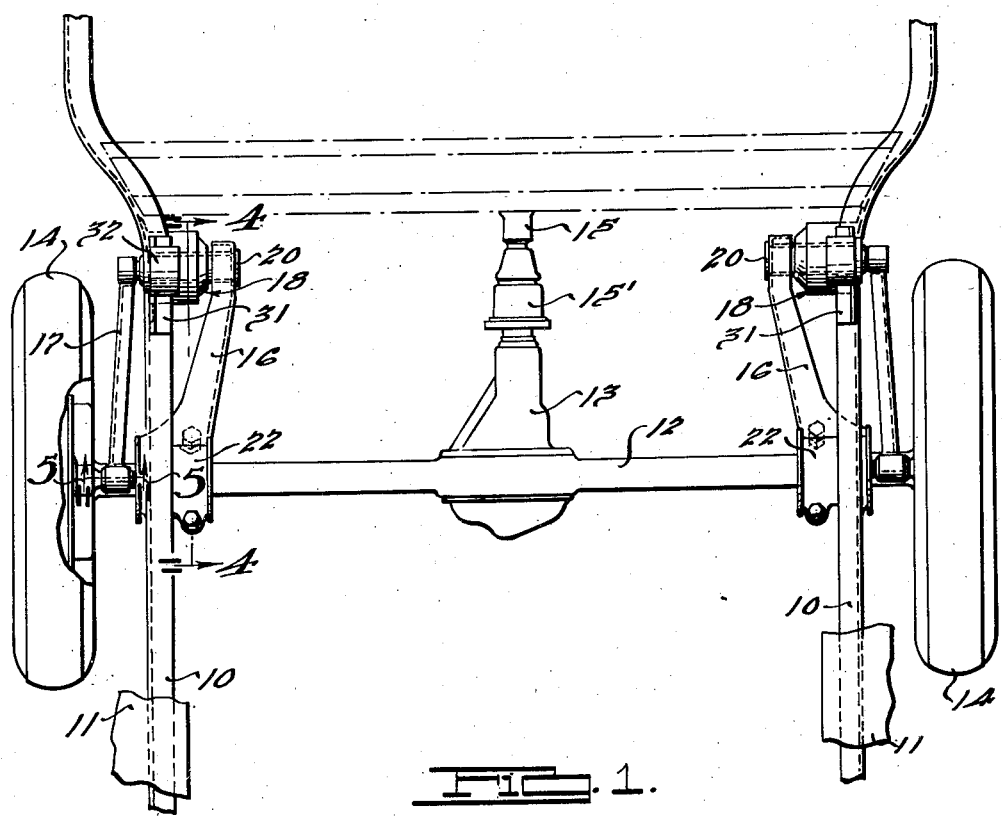
INVENTOR
Alexander G. Herreshoff
BY Harness, Dind, Pate & Harris
ATTORNEYS

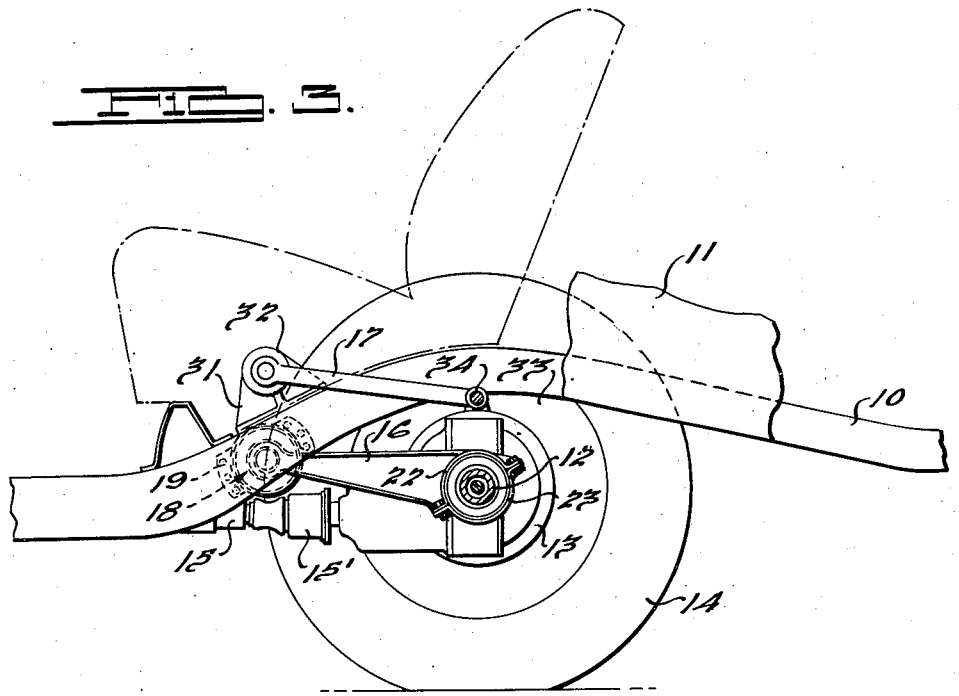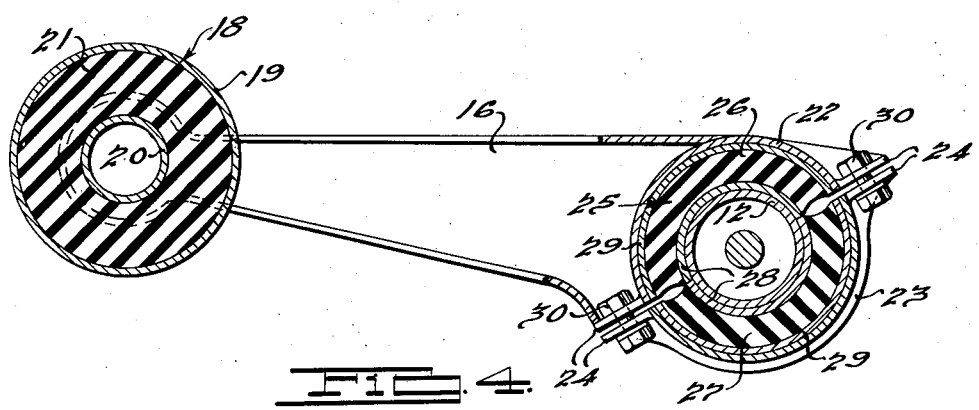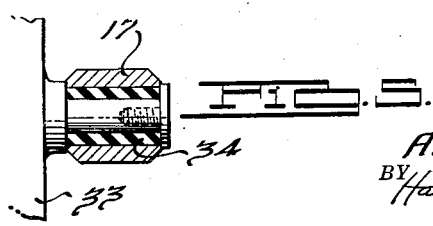

Patented June 24, 1941

2,246,847

UNITED STATES PATENT OFFICE 2,246,847

SUSPENSION MECHANISM

Alexander G. Herreshoff, Grosse Pointe, Mich., assignor to Chrysler Corporation, Highland Park, Mich., a corporation of Delaware Application November 10, 1939, Serial No. 303,840

5 Claims. (Cl. 267—21)

This invention relates to vehicle suspension mechanism and particularly to a suspension for automotive vehicles wherein the suspension members each include a pair of torsionally yieldable units each having a body of rubber, or other material of rubber-like properties, arranged to support the load of the sprung parts of the vehicle in torsion.

The principal object of the invention is to provide in combination with a "Hotchkiss" type of drive, a suspension for the driving axle which has sufficient strength and rigidity to absorb the driving and braking stresses incident to the operation of the vehicle, yet is of simple form and economical to manufacture.

An additional object is to provide a suspension of this type in which the rubber mass of the torsional suspension units is divided, part being carried by the axle as unsprung weight and part being carried by the frame as sprung weight.

A further object is to provide a suspension of this type which inherently provides for lateral control of the axle and which does not require the use of stabilizer bars, anti-sway bars, etc.

A still further object is to provide a rear axle suspension which requires not lubrication, but which has noise and shock absorbing qualities that are superior to the suspensions of the prior art.

Other objects and advantages of the invention will be apparent from the following description taken in connection with the following drawings, in which:

Fig. 1 is a top plan view of the improved suspension system.

Fig. 2 is a rear elevation of the same.

Fig. 3 is a side elevation of the same.

Fig. 4 is a sectional view through one of the suspension members taken along the line 4—4 of Fig. 2.

Fig. 5 is a sectional view through the axle pivot connection of the guide arm taken along the line 5—5 of Fig. 1.

Referring to the drawings in which like reference numerals designate like parts in the following description, the numeral 10 designates the chassis side sills to which the wheel-house portions 11 of the body are attached as is conventional in the art. A rear driving axle 12 provided with the usual differential housing 13 has the road wheels 14 mounted at opposite ends thereof. A propeller shaft 15 drivingly connects the differential gearing with the vehicle power plant (not shown) and has the usual universal connection 15' at its rear end adjacent the differential housing.

Each of the suspension unit assemblies, which are identical at each side of the vehicle, consists of a suspension arm 16 and a guide arm or link 17.

The suspension arm 16 is of stamped construction and is pivoted at its forward end to the side sill 10 by means of a rubber torsion unit 18, the connection being carried by a frame mounted bracket 19. The arm 16 is of channel construction and is non-rotatably fixed at one end to a hollow stub shaft 30 which is bonded to a mass of rubber 21 of cylindrical form. The outer cylindrical surface of the rubber mass 21 is bonded to the inner complementary surface of the bracket 19 which also holds the rubber under radial compressive stress.

The opposite end of the arm 16 terminates in a semi-cylindrical socket member which is adapted to mate with a second semi-cylindrical socket member 23, the two members being provided with oppositely disposed abutment lugs or flanges 24 at each side thereof.

The socket members 22 and 23 embrace the axle housing 12 but are spaced therefrom as illustrated in Fig. 4, the space between the housing and the socket members being occupied by the rubber torsion unit 25. The latter consists of a pair of identical semi-cylindrical structures 26 and 27, each of which comprises an inner semi-cylindrical sleeve member 28 separated from an outer semi-cylindrical sleeve member 29 by a mass of rubber which is bonded or otherwise secured to both. Upon assembly, the halves 26, 27 of the suspension unit 25 are slid into position between the axle 12 and the socket members 22, 23 and the bolts 30 are tightened to bring the lugs 24 toward each other and place the rubber under radial compressive stress. In order to make sure that the suspension unit 25 will remain immovable relative to the axle 12 and the arm 16, the respective contacting surfaces of the parts 12, 28, 29 and 23 may be serrated, splined, or other known means of preventing movement may be resorted to.

The guide link or arm 17 is preferably disposed in parallelism with the arm 16 but spaced laterally outwardly of the side sills 10 relative thereto, and is pivoted at one end to the frame mounted bracket 31 by means of a shock absorber 32 and at its other end to the brake backing plate 33 by a rubber bushing 34.

The arms 16 and 17 form part of a parallelogram which guides the axle in its movement. As is apparent from Figs. 3 and 4, rising and falling movement of the axle relative to the frame places the rubber of the units 18 and 25 in torsional shear. By providing a parallelogram guide linkage at each side of the axle 12, the axle is guided in such manner that no twisting strains are imposed on the axle housing, a line passing through the axes of the bushing 34 and the axle being parallel to a similar line at the other side of the vehicle at all times. The links 17 also guide the axle in such manner that the unit 25 is placed in torsion during rising and falling thereof.

By providing a pair of torsion units at each side of the vehicle, the necessity for mounting a large mass of rubber at one spot is avoided and the torsional shearing action of the rubber is divided into two separate components which reduces the working limits of the units thus promoting longer life and reducing fatigue.

Rocking movement of the axle about the axis of the propeller shaft 15 is accommodated by the rubber bushings 18, 32 and 24 and by the arms 16 and 17 which are capable of twisting to a slight degree.

As is illustrated in Figs. 1 and 2, the socket portions 22, 23 of the arms 16 are comparatively long in the axial direction of the axle, thus tendency for the frame 10 to move laterally relative to the axle is resisted by compression of the rubber in units 25. This feature renders the use of radius rods, etc. between the axle and frame unnecessary.

Having thus described my invention, that which I claim as new and desire to secure by Letters Patent is set forth in the following claims.

I claim:

1. In a suspension mechanism for a vehicle having a frame and an axle, means for mounting said axle on said frame for rising and falling movement relative thereto comprising an arm pivoted at one end on said frame, the pivotal connection thereof including a mass of rubber adapted to be placed in torsion by pivotal movement of said arm; a socket on the other end of said arm surrounding said axle but spaced therefrom; and a mass of rubber disposed between said socket and said axle and fixed respectively thereto.

2. In a suspension mechanism for a vehicle having a frame and an axle, means for mounting said axle on said frame for rising and falling movement relative thereto comprising an arm pivoted at one end on said frame, the pivotal connection thereof including a mass of rubber adapted to be placed in torsion by pivotal movement of said arm; a socket on the other end of said arm surrounding said axle but spaced radially therefrom; a mass of rubber disposed in the space between said socket and said axle and fixed against movement relative to said socket and axle respectively; and means for rotating said axle relative to said socket during rising and falling movement of said axle.

3. In a suspension mechanism for a vehicle having a frame and an axle, means for mounting said axle on said frame for rising and falling movement relative to said frame comprising a pair of parallel arms pivoted to said axle and frame at each side thereof on axes extending substantially transversely of the vehicle, at least one of the pivotal connections of each of said arms including rubber in torsion; said arms being so proportioned that the twisting incident to rocking movement of the axle is absorbed in part by said arms and in part by said rubber.

4. In a suspension mechanism for a vehicle having a frame and an axle, means for mounting said axle on said frame for rising and falling movement relative thereto comprising pairs of arms respectively disposed in parallelism at each side of the vehicle; one of the arms of each pair having a socket at the outer end thereof surrounding the axle and spaced therefrom by a body of rubber fixed against movement relatively to said arm and axle and having its other end connected to the frame through a torsionally yieldable connection including a body of rubber whereby rising and falling movement of the axle is resisted by deformation of both bodies of rubber.

5. In a suspension mechanism for a vehicle having a frame and an axle, means for mounting said axle on said frame for rising and falling movement relative thereto comprising pairs of arms respectively disposed in parallelism at each side of the vehicle; one of the arms of each pair having a socket at the outer end thereof surrounding the axle and spaced therefrom by a body of rubber fixed against movement relatively to said arm and axle and having its other end connected to the frame through a torsionally yieldable connection including a body of rubber whereby said axle is constrained to movement in a predetermined path during rising and falling movement and said movement is resisted by both bodies of rubber.

ALEXANDER G. HERRESHOFF.